(12) United States Patent
Pinheiro et al.

(10) Patent No.: US 11,687,652 B1
(45) Date of Patent: Jun. 27, 2023

(54) CLUSTERING OF BINARY FILES USING ARCHITECTURE-AGNOSTIC DIGESTS

(71) Applicant: Trend Micro Incorporated, Tokyo (JP)

(72) Inventors: Fernando Vinicius Merces Pinheiro, Sao Paulo (BR); Joey Nojas Costoya, Manila (PH)

(73) Assignee: Trend Micro Incorporated, Tokyo (JP)

( * ) Notice: Subject to any disclaimer, the term of this patent is extended or adjusted under 35 U.S.C. 154(b) by 970 days.

(21) Appl. No.: 16/552,430

(22) Filed: Aug. 27, 2019

(51) Int. Cl.
*G06F 21/00* (2013.01)

(52) U.S. Cl.
CPC .................... *G06F 21/565* (2013.01); *G06F 2221/034* (2013.01)

(58) Field of Classification Search
CPC ..................................................... G06F 21/565
See application file for complete search history.

(56) References Cited

U.S. PATENT DOCUMENTS 9,690,938 B1* 6/2017 Saxe et al. ............. G06N 20/00
2021/0073377 A1* 3/2021 Coull et al. .......... G06N 3/0454

OTHER PUBLICATIONS

Jonathan Oliver, et al. "TLSH - A Locality Sensitive Hash", Nov. 2013, 19 sheets, Trend Micro, 4th Cybercrime and Trustworthy Computing Workshop, Sydney, Australia.

* cited by examiner

*Primary Examiner* — Jeffrey C Pwu
*Assistant Examiner* — Thong P Truong
(74) *Attorney, Agent, or Firm* — Beyer Law Group LLP

(57) ABSTRACT

A target binary file is clustered by reducing the target binary file to its architecture-agnostic functions, which are converted into an input string. The target digest of the input string is calculated and compared to digests of malicious binary files. A cluster having digests of malicious binary files that are similar to the target digest is identified. In response to identifying the cluster, the target binary file is detected to be malicious and of the same malware family as the malicious binary files of the cluster.

20 Claims, 9 Drawing Sheets

```
                                                           300

7f 45 4c 46 01 01 01 00  00 00 00 00 00 00 00 00  |.ELF............|
02 00 03 00 01 00 00 00  20 87 04 08 34 00 00 00  |........ ...4...|
...
00 6c 69 62 63 2e 73 6f  2e 36 00 5f 49 4f 5f 73  |.libc.so.6._IO_s|
74 64 69 6e 5f 75 73 65  64 00 65 78 69 74 00 66  |tdin_used.exit.f|
74 65 6c 6c 00 70 75 74  73 00 73 65 6c 65 63 74  |tell.puts.select|
00 72 65 77 69 6e 64 00  66 67 65 74 63 00 63 61  |.rewind.fgetc.ca|
6c 6c 6f 63 00 66 73 65  65 6b 00 67 65 74 6f 70  |lloc.fseek.getop|
74 00 66 63 6c 6f 73 65  00 73 74 72 74 6f 75 6c  |t.fclose.strtoul|
00 5f 5f 63 74 79 70 65  5f 62 5f 6c 6f 63 00 6f  |.__ctype_b_loc.o|
70 74 61 72 67 00 73 74  64 65 72 72 00 66 69 6c  |ptarg.stderr.fil|
65 6e 6f 00 66 72 65 61  64 00 73 74 72 63 68 72  |eno.fread.strchr|
00 66 70 72 69 6e 74 66  00 71 73 6f 72 74 00 66  |.fprintf.qsort.f|
6f 70 65 6e 36 34 00 5f  5f 6c 69 62 63 5f 73 74  |open64.__libc_st|
61 72 74 5f 6d 61 69 6e  00 66 72 65 65 00 5f 5f  |art_main.free.__|
67 6d 6f 6e 5f 73 74 61  72 74 5f 5f 00 47 4c 49  |gmon_start__.GLI|
42 43 5f 32 2e 33 00 47  4c 49 42 43 5f 32 2e 31  |BC_2.3.GLIBC_2.1|
00 47 4c 49 42 43 5f 32  2e 30 00 00 00 00 02 00  |.GLIBC_2.0......|
```

300

```
7f 45 4c 46 01 01 01 00  00 00 00 00 00 00 00 00  |.ELF............|
02 00 03 00 01 00 00 00  20 87 04 08 34 00 00 00  |........ ...4...|
...
00 6c 69 62 63 2e 73 6f  2e 36 00 5f 49 4f 5f 73  |.libc.so.6._IO_s|
74 64 69 6e 5f 75 73 65  64 00 65 78 69 74 00 66  |tdin_used.exit.f|
74 65 6c 6c 00 70 75 74  73 00 73 65 6c 65 63 74  |tell.puts.select|
00 72 65 77 69 6e 64 00  66 67 65 74 63 00 63 61  |.rewind.fgetc.ca|
6c 6c 6f 63 00 66 73 65  65 6b 00 67 65 74 6f 70  |lloc.fseek.getop|
74 00 66 63 6c 6f 73 65  00 73 74 72 74 6f 75 6c  |t.fclose.strtoul|
00 5f 5f 63 74 79 70 65  5f 62 5f 6c 6f 63 00 6f  |.__ctype_b_loc.o|
70 74 61 72 67 00 73 74  64 65 72 72 00 66 69 6c  |ptarg.stderr.fil|
65 6e 6f 00 66 72 65 61  64 00 73 74 72 63 68 72  |eno.fread.strchr|
00 66 70 72 69 6e 74 66  00 71 73 6f 72 74 00 66  |.fprintf.qsort.f|
6f 70 65 6e 36 34 00 5f  5f 6c 69 62 63 5f 73 74  |open64.__libc_st|
61 72 74 5f 6d 61 69 6e  00 66 72 65 65 00 5f 5f  |art_main.free.__|
67 6d 6f 6e 5f 73 74 61  72 74 5f 5f 00 47 4c 49  |gmon_start__.GLI|
42 43 5f 32 2e 33 00 47  4c 49 42 43 5f 32 2e 31  |BC_2.3.GLIBC_2.1|
00 47 4c 49 42 43 5f 32  2e 30 00 00 00 00 02 00  |.GLIBC_2.0......|
```

```
Num:   Value    Size Type    Bind   Vis     Ndx Name
  0: 00000000     0 NOTYPE  LOCAL  DEFAULT  UND
  1: 00000000     0 FUNC    GLOBAL DEFAULT  UND printf@GLIBC_2.0 (2)
  2: 00000000     0 OBJECT  GLOBAL DEFAULT  UND stderr@GLIBC_2.0 (2)
  3: 00000000     0 FUNC    GLOBAL DEFAULT  UND fclose@GLIBC_2.1 (3)
  4: 00000000     0 FUNC    GLOBAL DEFAULT  UND select@GLIBC_2.0 (2)
  5: 00000000     0 FUNC    GLOBAL DEFAULT  UND rewind@GLIBC_2.0 (2)
  6: 00000000     0 FUNC    GLOBAL DEFAULT  UND fseek@GLIBC_2.0 (2)
  7: 00000000     0 FUNC    GLOBAL DEFAULT  UND fopen64@GLIBC_2.1 (3)
  8: 00000000     0 FUNC    GLOBAL DEFAULT  UND fread@GLIBC_2.0 (2)
  9: 00000000     0 FUNC    GLOBAL DEFAULT  UND puts@GLIBC_2.0 (2)
 10: 00000000     0 NOTYPE  WEAK   DEFAULT  UND __gmon_start__
 11: 00000000     0 FUNC    GLOBAL DEFAULT  UND exit@GLIBC_2.0 (2)
 12: 00000000     0 FUNC    GLOBAL DEFAULT  UND strtoul@GLIBC_2.0 (2)
 13: 00000000     0 FUNC    GLOBAL DEFAULT  UND strchr@GLIBC_2.0 (2)
 14: 00000000     0 FUNC    GLOBAL DEFAULT  UND __libc_start_main@GLIBC_2.0 (2)
 15: 00000000     0 FUNC    GLOBAL DEFAULT  UND fprintf@GLIBC_2.0 (2)
 16: 00000000     0 FUNC    GLOBAL DEFAULT  UND getopt@GLIBC_2.0 (2)
 17: 00000000     0 FUNC    GLOBAL DEFAULT  UND ftell@GLIBC_2.0 (2)
 18: 00000000     0 FUNC    GLOBAL DEFAULT  UND fileno@GLIBC_2.0 (2)
 19: 00000000     0 FUNC    GLOBAL DEFAULT  UND fgetc@GLIBC_2.0 (2)
 20: 00000000     0 FUNC    GLOBAL DEFAULT  UND qsort@GLIBC_2.0 (2)
 21: 00000000     0 OBJECT  GLOBAL DEFAULT  UND optarg@GLIBC_2.0 (2)
 22: 00000000     0 FUNC    GLOBAL DEFAULT  UND __ctype_b_loc@GLIBC_2.3 (4)
 23: 00000000     0 FUNC    GLOBAL DEFAULT  UND calloc@GLIBC_2.0 (2)
 24: 00000000     0 FUNC    GLOBAL DEFAULT  UND free@GLIBC_2.0 (2)
 25: 08048f8c     4 OBJECT  GLOBAL DEFAULT   16 _IO_stdin_used
```

```
Num:   Value    Size Type   Bind    Vis     Ndx Name
   1: 00000000     0 FUNC   GLOBAL DEFAULT  UND printf@GLIBC_2.0 (2)
   3: 00000000     0 FUNC   GLOBAL DEFAULT  UND fclose@GLIBC_2.1 (3)
   4: 00000000     0 FUNC   GLOBAL DEFAULT  UND select@GLIBC_2.0 (2)
   5: 00000000     0 FUNC   GLOBAL DEFAULT  UND rewind@GLIBC_2.0 (2)
   6: 00000000     0 FUNC   GLOBAL DEFAULT  UND fseek@GLIBC_2.0 (2)
   8: 00000000     0 FUNC   GLOBAL DEFAULT  UND fread@GLIBC_2.0 (2)
  11: 00000000     0 FUNC   GLOBAL DEFAULT  UND exit@GLIBC_2.0 (2)
  15: 00000000     0 FUNC   GLOBAL DEFAULT  UND fprintf@GLIBC_2.0 (2)
  16: 00000000     0 FUNC   GLOBAL DEFAULT  UND getopt@GLIBC_2.0 (2)
  17: 00000000     0 FUNC   GLOBAL DEFAULT  UND ftell@GLIBC_2.0 (2)
  18: 00000000     0 FUNC   GLOBAL DEFAULT  UND fileno@GLIBC_2.0 (2)
  19: 00000000     0 FUNC   GLOBAL DEFAULT  UND fgetc@GLIBC_2.0 (2)
  20: 00000000     0 FUNC   GLOBAL DEFAULT  UND qsort@GLIBC_2.0 (2)
  23: 00000000     0 FUNC   GLOBAL DEFAULT  UND calloc@GLIBC_2.0 (2)
  24: 00000000     0 FUNC   GLOBAL DEFAULT  UND free@GLIBC_2.0 (2)
```

FIG. 6

*330* calloc,exit,fclose,fgetc,fileno,fprintf,fread,free,fseek,ftell,getopt,printf,qsort, rewind,select

4CB01247570B11C8557A446148813F9610836401FCBC2B000C08 C040000C183658E84F

CLUSTERING OF BINARY FILES USING ARCHITECTURE-AGNOSTIC DIGESTS

BACKGROUND OF THE INVENTION

1. Field of the Invention

The present invention relates generally to cybersecurity, and more particularly but not exclusively to evaluation and analysis of computer files ("files") for cyber threats.

2. Description of the Background Art

A large number of Internet-of-things (IOT) devices have LINUX-based operating systems. Consequently, the increasing popularity of IOT devices has incentivized cybercriminals to create malware for LINUX-based operating systems. The Executable and Linkable Format (ELF) is a standard binary file format for LINUX-based operating systems. Because LINUX-based operating systems are available for different processor architectures (e.g., SUN SPARC architecture, the ARM architecture, the MIPS architecture, etc.), each with its own architecture-specific code, the number of different malicious ELF binary files in the wild has increased with the popularity of IOT devices. This makes it relatively difficult to identify malicious ELF binary files and their variants.

SUMMARY

In one embodiment, a target binary file is clustered by reducing the target binary file to its architecture-agnostic functions, which are converted into an input string. The target digest of the input string is calculated and compared to digests of malicious binary files. A cluster having digests of malicious binary files that are similar to the target digest is identified. In response to identifying the cluster, the target binary file is detected to be malicious and of the same malware family as the malicious binary files of the cluster.

These and other features of the present invention will be readily apparent to persons of ordinary skill in the art upon reading the entirety of this disclosure, which includes the accompanying drawings and claims.

DESCRIPTION OF THE DRAWINGS

FIGS. 4-8 further illustrate the method of FIG. 2 in accordance with an embodiment of the present invention.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The following embodiments are explained using ELF binary files as examples. As can be appreciated, the embodiments may be adapted to cluster other suitable binary files.

Figure 1:
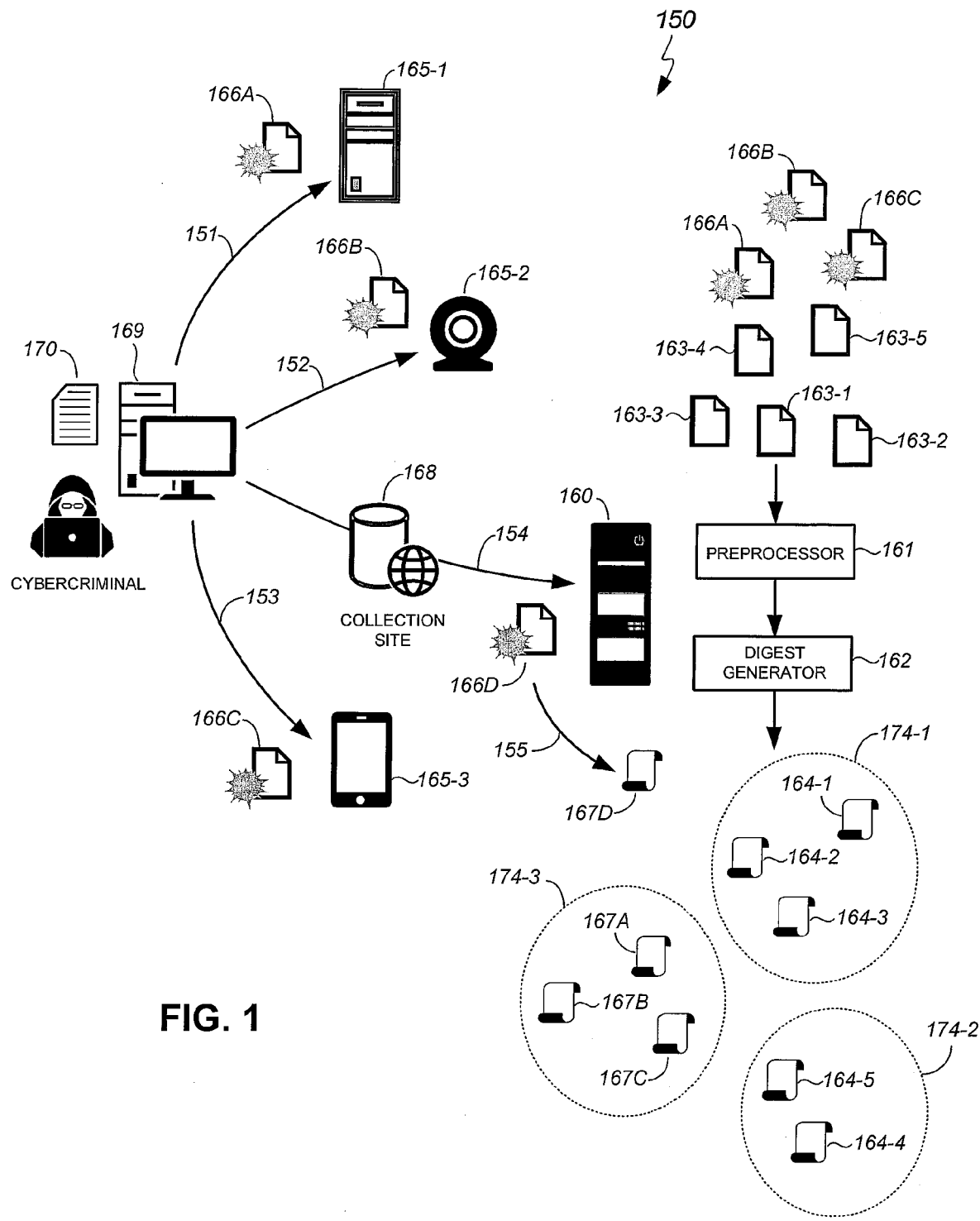
FIG. 1 shows a logical diagram of a system for clustering binary files in accordance with an embodiment of the present invention.

Referring now to FIG. 1, there is shown a logical diagram of a system 150 for clustering binary files in accordance with an embodiment of the present invention. In the example of FIG. 1, the system 150 includes an evaluation computer 160 that is configured to cluster binary files, which in the following embodiments are ELF binary files. The evaluation computer 160 clusters a target (i.e., being evaluated) binary file by identifying other binary files that are similar to the target binary file. The other binary files may be a cluster of similar malicious binary files, i.e., malware. Accordingly, finding that the target binary file is similar to a cluster of malicious binary files indicates that the target binary file is also malicious. Furthermore, identifying other binary files that are similar to the target binary file facilitates creation or selection of suitable antidote for files or other computer components infected by the target binary file.

The devices 165 (i.e., 165-1, 165-2,...) may comprise a computing device that communicates over a computer network. In the example of FIG. 1, the devices 165 run a Linux-based operating system. The devices 165 may comprise IOT devices, smartphones, laptop computers, desktop computers, and other computing devices. The processors of each of the devices 165 may have different architectures. For example, the device 165-1 may have a SPARC processor, the device 165-2 may have an ARM processor, the device 165-3 may have a MIPS processor, etc.

A cybercriminal may generate and distribute malicious binary files 166 (i.e., 166A, 166B, 166C, 166D,...), which in the example of FIG. 1 are ELF binary files, over the Internet. The malicious binary files 166 may comprise a computer virus or other malicious code. To attack as many devices 165 as possible, the cybercriminal may compile a source code 170 comprising the malicious code for different processor architectures using suitable compilers. Compiling a source code generates an object file of the source code; the object file is in binary (as opposed to text) format. Linking is the process of taking one or more object files to create a single executable file. Linking allows an object file, such as an ELF binary file, to call functions that are in other object files at runtime. An object file may be linked statically or dynamically.

In the example of FIG. 1, the cybercriminal may generate the binary file 166A by compiling the source code 170 using a compiler for a SPARC processor, the binary file 166B by compiling the source code 170 using another compiler for an ARM processor, the binary file 166C by compiling the source code 170 using yet another compiler for a MIPS processor, etc. The cybercriminal is thus able to use the same source code 170 to generate the binary files 166A, 166B, 166C, etc. Because of the different compilers and processor architectures involved, the binary files 166 will be different from each other, although they are from the same source code 170. The binary files 166 are thereafter propagated over the Internet (e.g., by phishing, drive-by download, etc.) to attack compatible devices 165 (see arrows 151 to 153).

In the example of FIG. 1, the evaluation computer 160 comprises at least one processor and memory, with the memory storing instructions that, when executed by the at least one processor, cause the evaluation computer 160 to cluster binary files as described herein. The evaluation computer 160 includes a preprocessor 161 and a digest generator 162. In one embodiment, the preprocessor 161 and the digest generator 162 are implemented in software. As can be appreciated, the preprocessor 161 and the digest generator 162 may also be implemented in hardware (e.g., field programmable gate array, programmable logic device) or combination of hardware and software.

The preprocessor 161 may be configured to receive a binary file 163 (i.e., 163-1, 163-2,...) and reduce the content of the binary file 163 into canonical forms, which in one embodiment are architecture-agnostic functions that are called at runtime. The functions are architecture-agnostic in that the functions are not dependent on the processor architecture for which the source code of the binary file 163 was compiled. Put another way, the functions remain the same, and are thus detectable, across different processor architectures. In one embodiment, the preprocessor 161 is configured to extract one or more functions that are called in the binary file 163 and form the functions (e.g., symbols that represent the names of the functions or destination addresses of function calls) into a string (also referred to herein as "input string") or other data format that may be input to a hashing function of the digest generator 162.

In the example of FIG. 1, a binary file 163 is an ELF binary file. In the case of a statically-linked ELF binary file with symbols of called functions or a dynamically-linked ELF binary file with or without symbols of called functions, the preprocessor 161 may be configured to extract symbols of the called functions from the content of the ELF binary file ("extracted function symbols"), remove symbols that are unrelated to the called functions from the extracted function symbols, remove compiler-specific and architecture-specific symbols from the extracted function symbols, and generate an input string of the remaining symbols. In the case of a statically-linked ELF file without symbols of called functions, the preprocessor 161 may be configured to extract the destination addresses of function calls from the content of the ELF binary file and generate an input string of the destination addresses.

The digest generator 162 may be configured to generate a digest of an input string; the digest of the input string is employed as the digest of the binary file from which the input string was generated. The digest generator 162 may employ a fuzzy hashing algorithm, such as a locality-sensitive hashing algorithm, to generate a digest 164 (i.e., 164-1, 164-2,...) of a binary file 163. In one embodiment, the digests 164 are generated using the Trend Micro Locality-Sensitive Hash (TLSH) algorithm. Open source program code of the TLSH algorithm is generally available on the Internet and other sources. Other suitable fuzzy hashing algorithm may also be employed without detracting from the merits of the present invention. A digest 164 of a binary file 163 may be generated by preprocessing the binary file 163 to generate an input string, which is input to the digest generator 162 to generate the digest 164. In the example of FIG. 1, the digest generator 162 generates a digest 164-1 of a binary file 163-1, a digest 164-2 of a binary file 163-2, a digest 164-3 of a binary file 163-3, etc.

Unlike other types of hashes, such as an SHA-1 hash, small changes to the data being fuzzy hashed will result in different but very similar fuzzy hashes. More particularly, in the example of FIG. 1, a binary file 163 and small changes to the binary file 163 will likely yield different but very similar digests 164.

The mathematical distance between two digests 164 may be calculated to determine similarity of the digests 164, and hence the similarity of their corresponding binary files 163. The smaller the mathematical distance, the more similar the two digests 164. In one embodiment, the similarity between digests 164 is calculated using the distance function of the TLSH algorithm. The mathematical distance may be an integer value, with a distance of zero indicating that the two digests 164 are identical. The closer the distance is to zero, the more similar the two digest 164. In one embodiment, two digests 164 are deemed to be similar when the distance between them is 50 or smaller. The threshold distance for deeming similarity of two digests 164 may be adjusted based on the particulars of the cybersecurity application, such as false positive or false negative requirements.

In the example of FIG. 1, the digests 164 are grouped into a plurality of clusters 174 (i.e., 174-1, 174-2,...), with each cluster 174 having digests 164 that are similar to one another as members. That is, for any given cluster 174, the digests 164 that are members of the cluster 174 are within the threshold mathematical distance for similarity. Using the cluster 174-1 as an example, the mathematical distance between the digest 164-1 and the digest 164-2, between the digest 164-2 and the digest 164-3, and between the digest 164-1 and the digest 164-3 is equal to or less than threshold mathematical distance (e.g., 50). The mathematical distance between members of separate clusters 174 is greater than the threshold mathematical distance for similarity. As a particular example, the mathematical distance between the digest 164-1 of the cluster 174-1 and the digest 164-5 of the digest 174-2 is greater than the threshold mathematical distance. Digests may be grouped into clusters 174 using any suitable clustering algorithm, without detracting from the merits of the present invention.

In one embodiment, the binary files 163 are ELF binary files that have been verified to be malicious. The binary files 163 may be received from one or more collection sites 168, such as honeypots, submission sites, endpoint computers (e.g., user or customer computers) that work in conjunction with the evaluation computer 160, and other sources. The digests 164 that are members of the same cluster 174 may be deemed to be digests of binary files 163 that belong to the same malware family. This is because of the similarity of the members of a cluster 174.

In the example of FIG. 1, the evaluation computer 160 receives the binary files 166A, 166B, and 166C from the collection site 168 or other sources. As previously noted, the files 166A, 166B, and 166C are malicious binary files that have been generated by compiling the source code 170 using compilers for different processor architectures. The evaluation computer 160 processes the binary files 166A, 166B, and 166C, using the preprocessor 161 and the digest generator 162, in the same manner as explained above for the binary files 163, to generate corresponding digests 167A, 167B, and 167C. Because the binary files 166 are from the same source code 170, their digests 167 will be very similar. Accordingly, a clustering operation involving the digests 167A, 167B, and 167C will result in a cluster 174-3 whose members are the digests 167A, 167B, and 167C.

When a binary file 166D, which is also from the source code 170, is later received at the evaluation computer 160 (see arrow 154), a digest 167D (see arrow 155) of the binary file 166D may be generated using the preprocessor 161 and the digest generator 162 in the manner previously described. By preprocessing the binary file 166D to reduce it into its architecture-agnostic functions and forming the functions into an input string using the preprocessor 161, and thereafter calculating the digest 167D of the input string using the digest generator 162, the digest 167D will be found to be very similar to the members of the cluster 174-3. That is, the binary file 166D will be clustered with and will be detected to be of the same malware family as the files 166A, 166B, and 166C. This provides many benefits, such as more information that can aid cybersecurity researchers in combating the malware family; treatment of infections by the binary file 166D using antidotes already developed for the binary files 166A, 166B, and 166D; tuning of patterns for detecting the malware family, etc.

Figure 2:
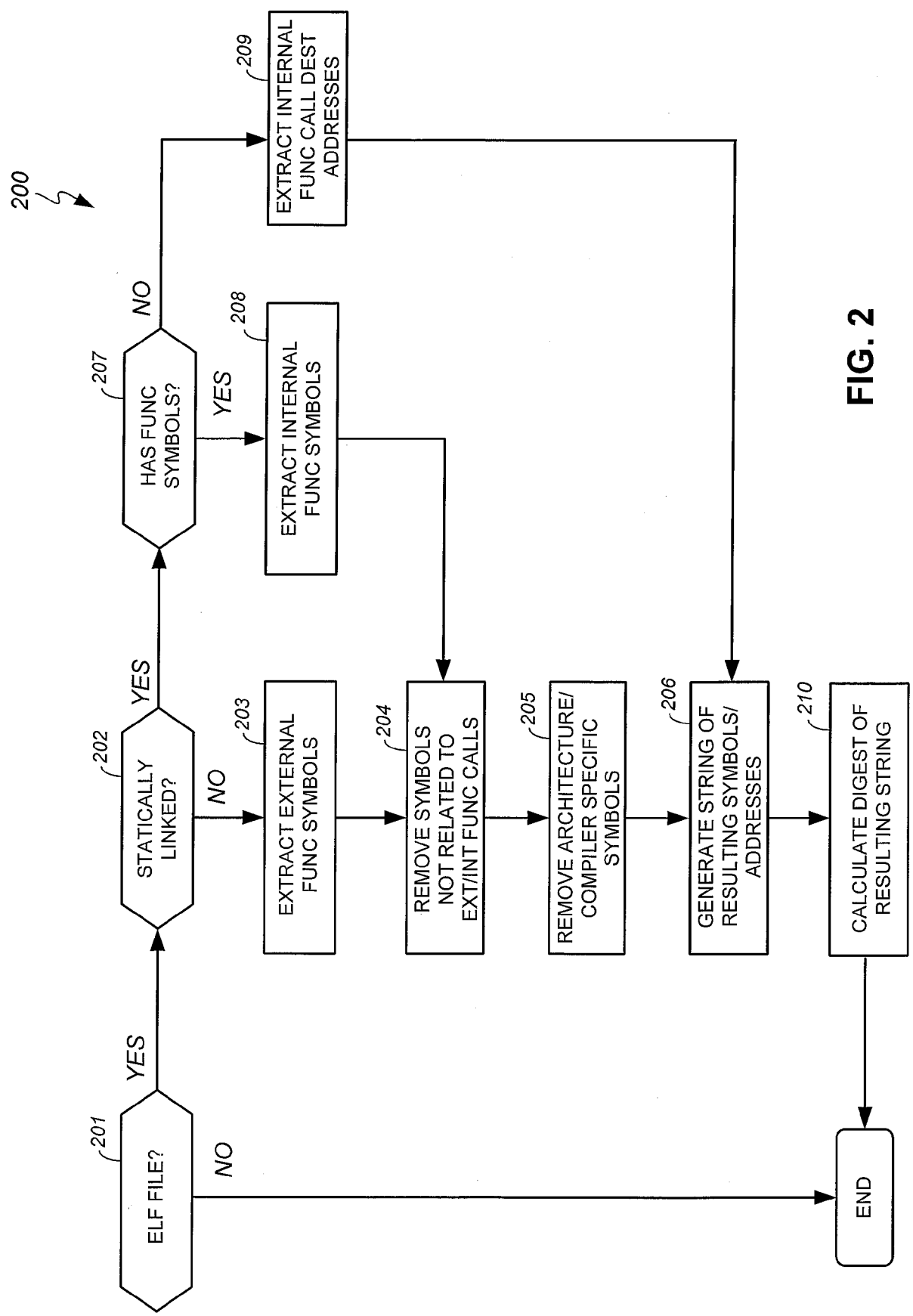
FIG. 2 shows a flow diagram of a computer-implemented method of generating digests of binary files in accordance with an embodiment of the present invention.

FIG. 2 shows a flow diagram of a computer-implemented method 200 of generating digests of binary files in accordance with an embodiment of the present invention. The method 200 may be performed by the evaluation computer 160. In one embodiment, the steps 201-209 are performed by the preprocessor 161 and the step 210 is performed by the digest generator 162.

In the example of FIG. 2, a target binary file is received in the evaluation computer 160 for clustering. The method 200 is employed to generate a digest of the target binary file when the target binary file is an ELF binary file (step 201, YES branch). The format of the target binary file may be checked against the ELF specification to determine if the target binary file is an ELF binary file. In the example of FIG. 2, the method 200 is not employed when the target binary file is not an ELF binary file (step 201, NO branch). When the target binary file is not an ELF binary file, a digest of the target binary file may be generated using other suitable methods, which may be an adaptation of the method 200 to the target binary file's format.

An ELF binary file may be linked statically or dynamically. A statically-linked ELF binary file calls functions that are internally within the file, whereas a dynamically-linked ELF binary file calls functions that may be external to the file. In a dynamically-linked ELF binary file, the external functions are linked at runtime. In computer science, a symbol is an identifier in a code. In an ELF binary file, functions that may be called at runtime have corresponding symbols that are noted in a symbol table. A dynamically-linked ELF binary file may be identified by the presence of a "PT_INTERP" segment or ".interp" section in the file; otherwise, the ELF binary file is statically-linked. Segments describe how to map a file into memory. A program contains zero or more segments, and each segment contains zero or more sections.

When the target binary file is a dynamically-linked ELF file (step 202, NO branch), symbols of called external functions are extracted from the target binary file (step 203). The extracted symbols may be placed in a buffer, from which symbols that are not related to the external functions are removed (step 204). From the remaining symbols in the buffer, compiler-specific and architecture-specific symbols are removed (step 205). Symbols that are specific to compilers and processor architectures that are suitable for ELF binary files may be readily identified by expressing these symbols as a regular expression, indicating these symbols in a listing for reference, etc. As their name suggests, compiler-specific symbols and architecture-specific symbols are different for different compilers and processor architectures.

What remains in the buffer after removing unrelated symbols, compiler-specific symbols, and architecture-specific symbols are symbols of architecture-agnostic functions that are called at runtime. These functions, and thus their symbols, are architecture-agnostic in that they will be the same for a common source code regardless of the processor architecture for which they are compiled. An input string may be generated by forming the symbols of the architecture-agnostic functions as a single string (step 206). For example, symbols that represent the names of the architecture-agnostic functions may be separated by commas and concatenated into a single string for input to the digest generator 162, which calculates the digest of the input string (step 210).

When the target binary file is a statically-linked ELF file (step 202, YES branch), the target binary file is inspected to check for presence of symbols of called internal functions (step 207). When the target binary file has symbols of called internal functions (step 207, YES branch), the symbols of the called internal functions are extracted from the target binary file (step 208). As is the case for dynamically-linked ELF binary files, the extracted symbols may be placed in a buffer, from which symbols that are not related to the called internal functions (step 204), symbols that are compiler-specific (step 205), and symbols that are architecture-specific are removed (step 205). The architecture-agnostic functions of the target binary file, which remain in the buffer, are thereafter formed into an input string (step 206). The digest generator 162 calculates the digest of the input string (step 210).

When the target binary file is a statically-linked ELF file but has no symbols of called internal functions (step 207, NO branch), the destination addresses of the internal functions are extracted from the target binary file (step 209). The destination addresses of the internal functions are formed into an input string (step 206) for input to the digest generator 162, which calculates the digest of the input string (step 210).

Figure 3:
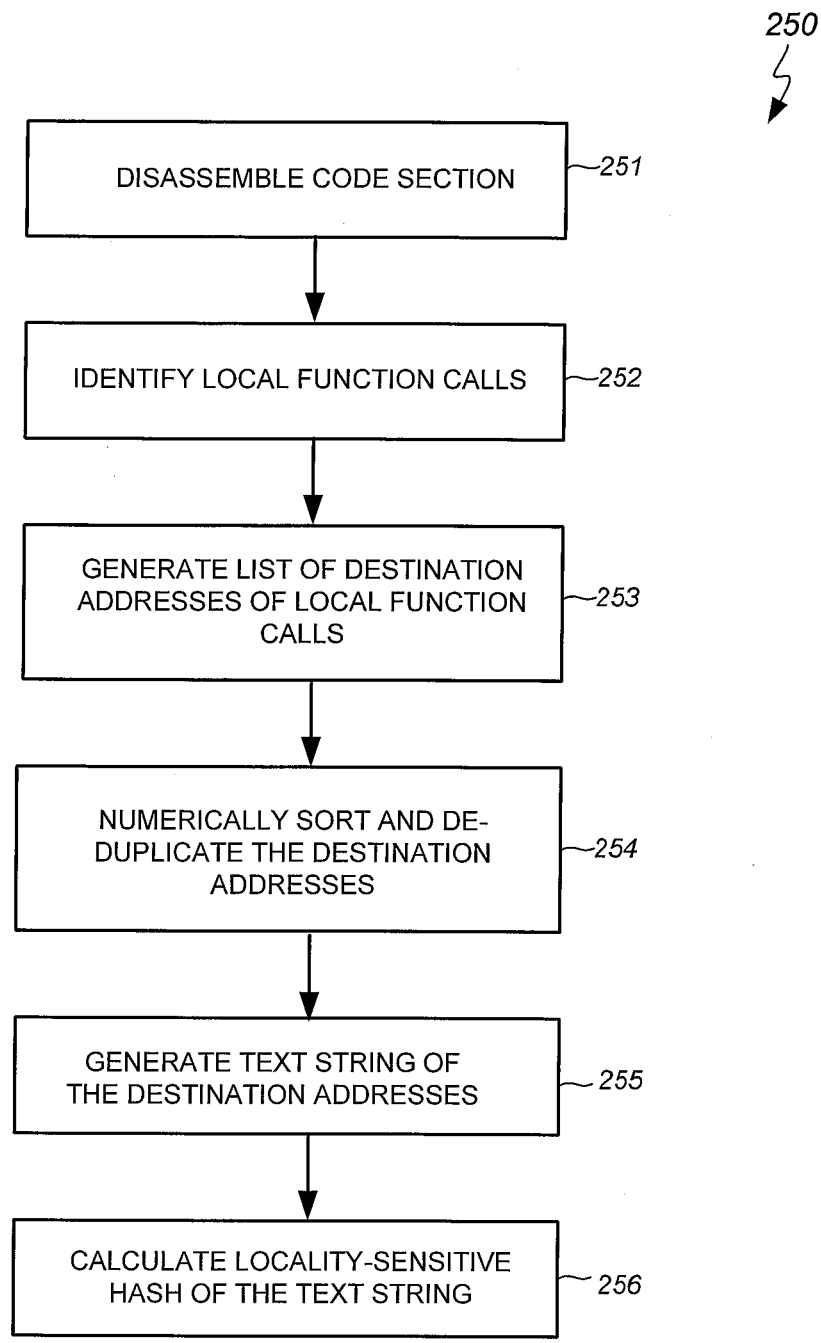
FIG. 3 shows a flow diagram of a computer-implemented method of generating a digest of an ELF binary file that is statically-linked but has no symbols of called internal functions, in accordance with an embodiment of the present invention.

FIG. 3 shows a flow diagram of a computer-implemented method 250 of generating a digest of an ELF binary file that is statically-linked but has no symbols of called internal functions, in accordance with an embodiment of the present invention. The method 250 is a particular embodiment of the steps 209, 206, and 210 of FIG. 2. In the example of FIG. 3, the code section of the ELF binary file, which is the target binary file in this example, is disassembled using a disassembly library (step 251). The disassembled code section is searched for all local function calls (e.g., CALL instruction in x86 architecture) (step 252). A list of the destination addresses of the local function calls (e.g., address operand of the CALL instructions in x86 architecture) is generated (step 253). The destination addresses are numerically sorted and de-duplicated (step 254). The destination addresses are formed into a single, comma-separated text string (step 255). A digest in the form of a locality-sensitive hash of the text string is calculated using a locality-sensitive hashing algorithm, such as the TLSH algorithm (step 256).

FIGS. 4-8 further illustrate the method 200 of FIG. 2 in accordance with an embodiment of the present invention. FIGS. 4-8 illustrate a particular example involving an ELF binary file that is dynamically-linked and with symbols of called external functions. As can be appreciated, embodiments of the present invention are equally applicable to other ELF binary files as explained with reference to FIG. 2.

FIG. 4 shows a portion of an ELF binary file 300 for which a digest will be generated in accordance with an embodiment of the present invention. As noted above, the ELF binary file 300 is dynamically-linked and with symbols of called external functions. FIG. 5 shows extracted symbols 310 of called external functions that are extracted from the ELF binary file 300. Note that the symbol on the first entry, i.e., on line 0 (see "NUM: 0"), is a NULL symbol.

FIG. 6 shows symbols of architecture-agnostic functions 320, which remain after removing unrelated symbols, compiler-specific symbols, and architecture-specific symbols from the extracted symbols 310. Comparing FIGS. 5 and 6, the symbols on lines 0 ("NUM: 0"), 2 ("NUM: 2"), 7 ("NUM: 7"), 9 ("NUM: 9"), 10 ("NUM: 10"), 12-14 ("NUM: 12" - "NUM: 14"), 21 ("NUM: 21"), 22 ("NUM: 22"), and 25 ("NUM: 25") have been removed from the extracted symbols 310 of FIG. 5, resulting in the architecture-agnostic functions 320.

FIG. 7 shows an input string 330 that have been formed by concatenating the names of the architecture-agnostic functions 320 into a single string that is delimited by commas. In the example of FIG. 7, the names of the architecture-agnostic functions 320 have been alphabetically sorted and de-duplicated. For example, the "calloc" function (see FIG. 6, NUM: 23) appears before the "exit" function (see FIG. 6, NUM: 11). The names of the architecture-agnostic functions have been selected for digest generation in this example. As can be appreciated, other suitable symbols of the architecture-agnostic functions may also be employed without detracting from the merits of the present invention. FIG. 8 shows a digest in the form of a locality-sensitive hash 340, which is generated by applying the TLSH algorithm on the input string 330.

Figure 9:
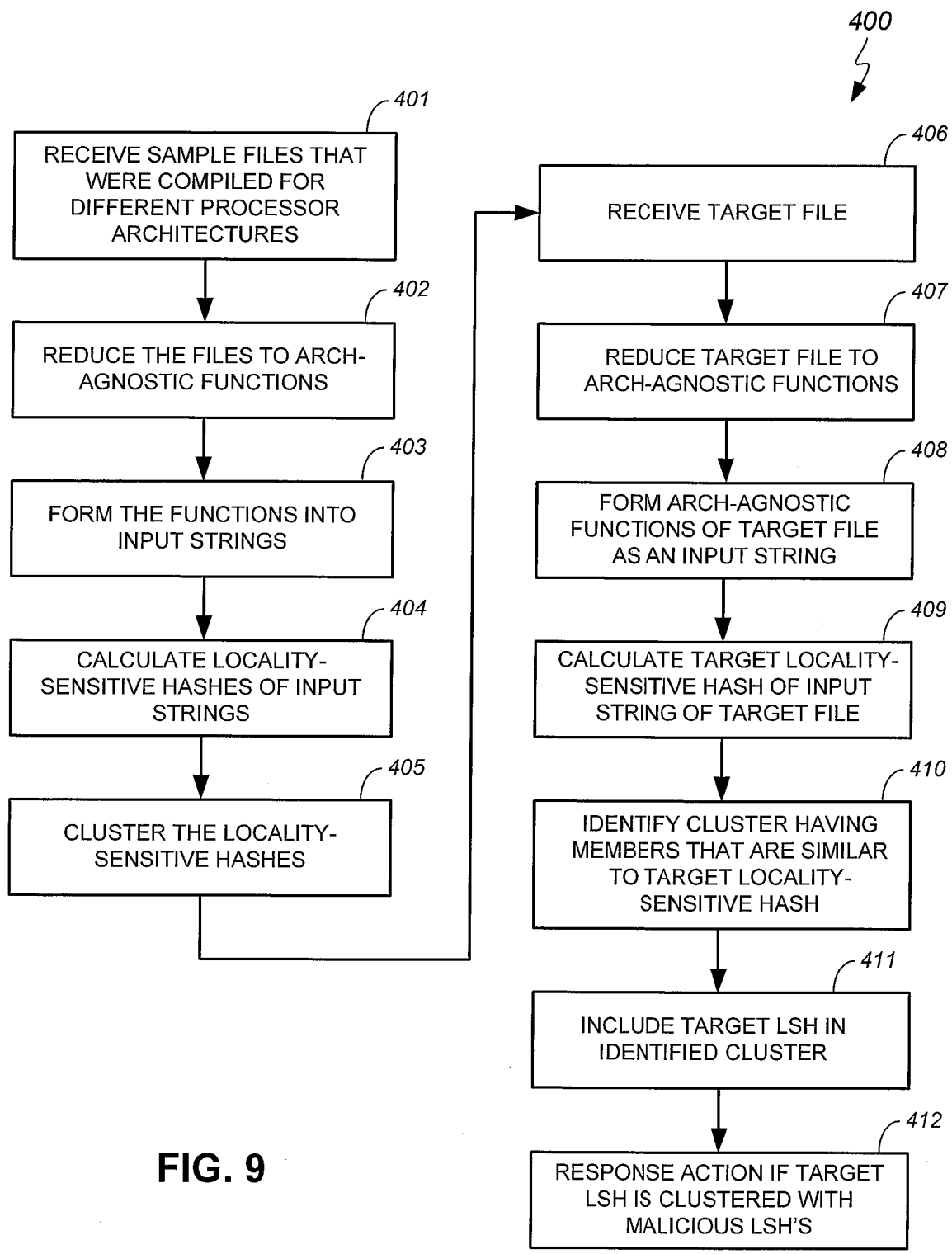
FIG. 9 shows a flow diagram of a computer-implemented method of clustering a binary file in accordance with an embodiment of the present invention.

FIG. 9 shows a flow diagram of a computer-implemented method 400 of clustering a binary file in accordance with an embodiment of the present invention. In the example of FIG. 9, steps 401-405 generate architecture-agnostic digests that are in the form of locality-sensitive hashes.

In the example of FIG. 9, sample binary files in the form of ELF binary files are received for digest generation (step 401). The ELF binary files were compiled for different processor architectures. The ELF binary files are reduced to their architecture-agnostic functions (step 402). In one embodiment, the architecture-agnostic functions are obtained from the ELF binary files by extracting symbols of called functions, and removing from the extracted symbols those symbols that are unrelated to the called functions, compiler-specific, and architecture-specific. Each of the architecture-agnostic functions, e.g., names of the functions or destination addresses of function calls, is formed into a single input string (step 403). The locality-sensitive hashes of the input strings are calculated (step 404). The locality-sensitive hashes are then grouped into clusters (step 405).

In the example of FIG. 9, a target binary file in the form of an ELF binary file is received for clustering (step 406). The target binary file is reduced to its architecture-agnostic functions (step 407). The architecture-agnostic functions of the target binary file are formed into a single input string (step 408). The locality-sensitive hash of the input string of the target binary file is calculated (step 409). In the example of FIG. 9, the process of generating digests of the target binary file and the sample binary files is the same to facilitate similarity determinations between the digest of the target binary file and the digests of the sample binary files. In one embodiment, the same fuzzy hashing algorithm (e.g., TLSH algorithm); the same criteria for removing unrelated symbols, compiler-specific symbols, architecture-specific symbols; and the same format of representing symbols of the architecture-agnostic functions (e.g., names or destination addresses) are used for the target binary file and the sample binary files.

A cluster having members that are similar to the target locality-sensitive hash of the target binary file is identified (step 410). The identified cluster have locality-sensitive hashes that are similar, e.g., each within a predetermined mathematical distance, to the target locality-sensitive hash. The target locality-sensitive hash is deemed to be a member of and is thus included in the identified cluster (step 411). A response action may be performed against the target binary file when the locality-sensitive hashes of the identified cluster are malicious (step 412). The response action may include blocking the target binary file from being executed in a computer, such as by putting the target binary file in quarantine, blocking network traffic that includes the target binary file, deleting the target binary file, etc.

As can be appreciated, the clustering of binary files are performed based on the linking type of the binary files. In one embodiment where the target binary file and the sample files are ELF binary files, the processing of statically-linked ELF binary files without symbols of called functions is separate from the processing of statically-linked ELF binary files with symbols of called functions, dynamically-linked ELF files with symbols of called functions, and dynamically-linked ELF files without symbols of called functions. That is, a locality-sensitive hash of a statically-linked ELF binary file without symbols of called functions is clustered with locality-sensitive hashes of statically-linked ELF binary files without symbols of called functions. On the other hand, a locality-sensitive hash of a statically-linked ELF binary file with symbols of called functions or of a dynamically-link ELF binary file with or without symbols of called functions is clustered with locality-sensitive hashes of statically-linked ELF binary files with symbols of called functions and dynamically-linked ELF binary files with or without symbols of called functions. This is because in the case of statically-linked ELF binary files without symbols of called functions, the destination addresses of the called functions may be used in the generation of the input string. Whereas in the case of the other linking types, the names of the called functions may be used in the generation of the input string.

Figure 10:
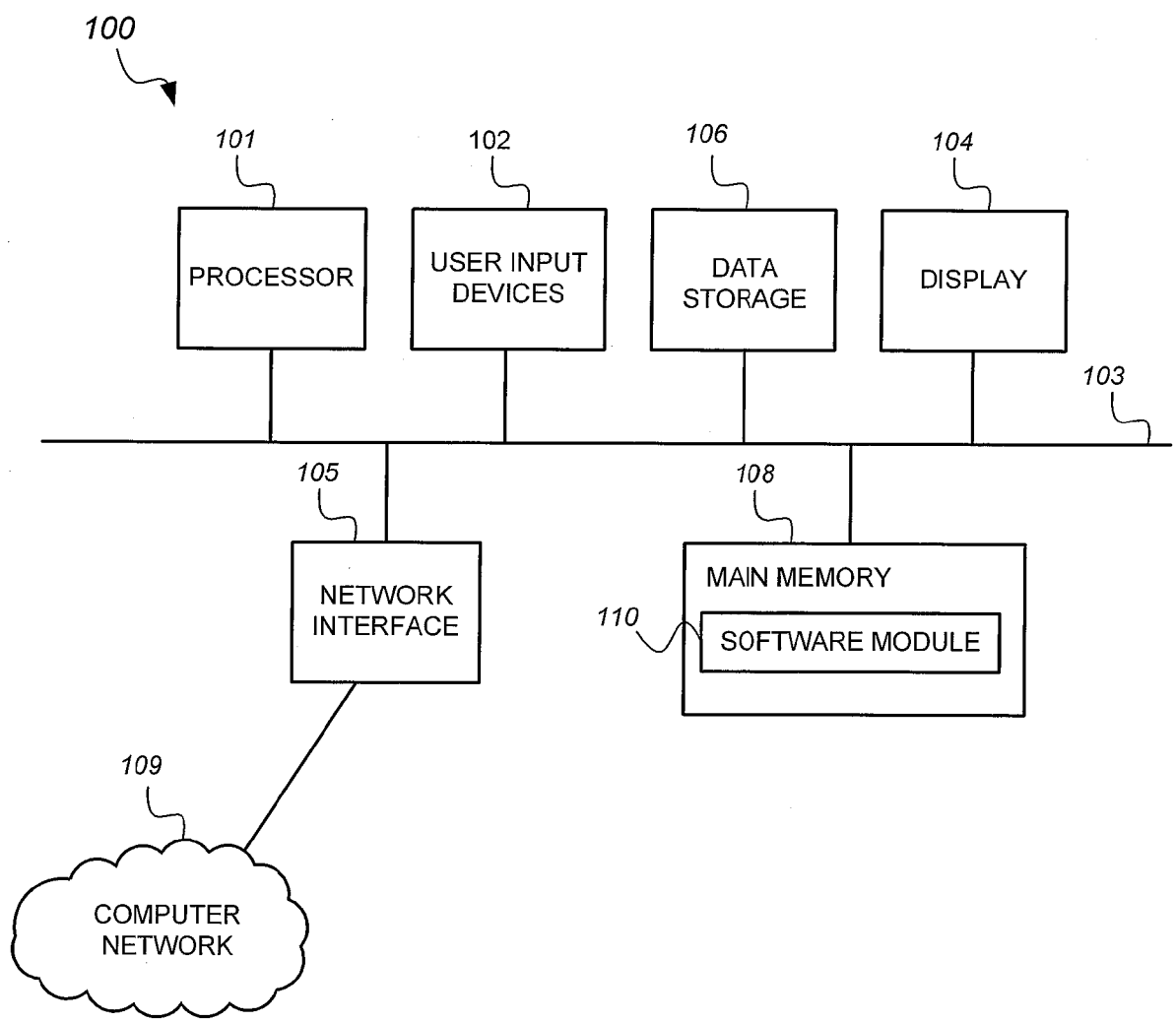
FIG. 10 shows a logical diagram of a computer system that may be employed with embodiments of the present invention.

FIG. 10 shows a logical diagram of a computer system 100 that may be employed with embodiments of the present invention. The computer system 100 may be employed as an evaluation computer 160 or other computer described herein. The computer system 100 may have fewer or more components to meet the needs of a particular application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory on the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110. In one embodiment where the computer system 100 is configured as the evaluation computer 160, the software modules 110 comprise the preprocessor 161 and the digests generator 162.

Systems and methods of clustering binary files have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method comprising:
receiving a target binary file;
reducing the target binary file to its architecture-agnostic functions that are called at runtime, wherein the architecture-agnostic functions are not dependent on a processor architecture for which a source code of the target binary file was compiled;
forming the architecture-agnostic functions of the target binary file into an input string;
calculating a target digest of the input string;
identifying a cluster comprising digests of malicious binary files that are similar to the target digest; and
in response to identifying the cluster, detecting the target binary file to be malicious and of a same malware family as the malicious binary files.

2. The method of claim 1, further comprising:
in response to detecting that the target binary file is malicious, performing a response action against the target binary file.

3. The method of claim 2, wherein the response action includes preventing the target binary file from being executed in a computer.

4. The method of claim 1, wherein reducing the target binary file to its architecture-agnostic functions comprises:
extracting symbols of called functions from the target binary file to generate extracted symbols;
removing compiler-specific symbols from the extracted symbols;
removing architecture-specific symbols from the extracted symbols; and
removing symbols that are not related to the called functions from the extracted symbols.

5. The method of claim 1, wherein forming the architecture-agnostic functions of the target binary file into the input string comprises:
forming names of the architecture-agnostic functions into a single text string.

6. The method of claim 5, wherein the names of the architecture-agnostic functions in the single text string are concatenated and separated by commas.

7. The method of claim 1, wherein reducing the target binary file to its architecture-agnostic functions comprises:
extracting destination addresses of called internal function from the target binary file.

8. The method of claim 7, wherein forming the architecture-agnostic functions of the target binary file into the input string comprises:
forming the destination addresses into a single text string.

9. The method of claim 1, wherein the target digest and the digests of the malicious binary files are locality-sensitive hashes, and identifying the cluster comprises calculating a mathematical distance between the target digest and the digests of the malicious binary files.

10. The method of claim 1, wherein the target binary file and the malicious binary files are Executable and Linkable Format (ELF) binary files.

11. A computer system comprising at least one processor and a memory, the memory storing instructions that, when executed by the at least one processor, cause the computer system to:
receive a target binary file;
reduce the target binary file to its architecture-agnostic functions that are called at runtime, wherein the architecture-agnostic functions are not dependent on a processor architecture for which a source code of the target binary file was compiled;
form the architecture-agnostic functions of the target binary file into an input string;
calculate a target locality-sensitive hash of the input string; and
identify a cluster comprising locality-sensitive hashes of malicious binary files that are within a threshold mathematical distance to the target locality-sensitive hash.

12. The computer system of claim 11, wherein the instructions stored in the memory, when executed by the at least one processor, further cause the computer system to:
in response to identifying the cluster, detect the target binary file to be malicious and of a same malware family as the malicious binary files; and
in response to detecting that the target binary file is malicious, perform a response action against the target binary file.

13. The computer system of claim 11, wherein the instructions stored in the memory, when executed by the at least one processor, cause the computer system to reduce the target binary file to its architecture-agnostic functions by:
extracting symbols of called functions from the target binary file to generate extracted symbols;
removing compiler-specific symbols from the extracted symbols;
removing architecture-specific symbols from the extracted symbols; and
removing symbols that are not related to the called functions from the extracted symbols.

14. The computer system of claim 11, wherein the instructions stored in the memory, when executed by the at least one processor, cause the computer system to form the architecture-agnostic functions of the target binary file into the input string by:
forming names of the architecture-agnostic functions into a single text string.

15. The computer system of claim 14, wherein the names of the architecture-agnostic functions in the single text string are concatenated and separated by commas.

16. The computer system of claim 11, wherein the instructions stored in the memory, when executed by the at least one processor, cause the computer system to reduce the target binary file to its architecture-agnostic functions by:
extracting destination addresses of called internal functions from the target binary file.

17. The computer system of claim 16, wherein the instructions stored in the memory, when executed by the at least one processor, cause the computer system to form the architecture-agnostic functions of the target binary file into the input string by:
forming the destination addresses into a single text string.

18. The computer system of claim 11, wherein the target binary file and the malicious binary files are Executable and Linkable Format (ELF) binary files.

19. A computer-implemented method comprising:

receiving a target Executable and Linkable Format (ELF) binary file;

extracting symbols of called functions from the target ELF binary file to generate extracted symbols;

removing symbols unrelated to the called functions from the extracted symbols;

removing compiler-specific symbols from the extracted symbols;

removing architecture-specific symbols from the extracted symbols;

after removing symbols that are unrelated to the called functions, compiler-specific symbols, and architecture-specific symbols from the extracted symbols, forming remaining symbols in the extracted symbols into an input string;

determining a target locality-sensitive hash of the input string; and identifying a locality-sensitive hash of a malicious ELF binary file that is within a threshold mathematical distance to the target locality-sensitive hash.

20. The computer-implemented method of claim 19, further comprising:

in response to identifying the locality-sensitive hash of the malicious ELF binary file, detecting that the target ELF binary file is malicious.

* * * * *